Figure 1:
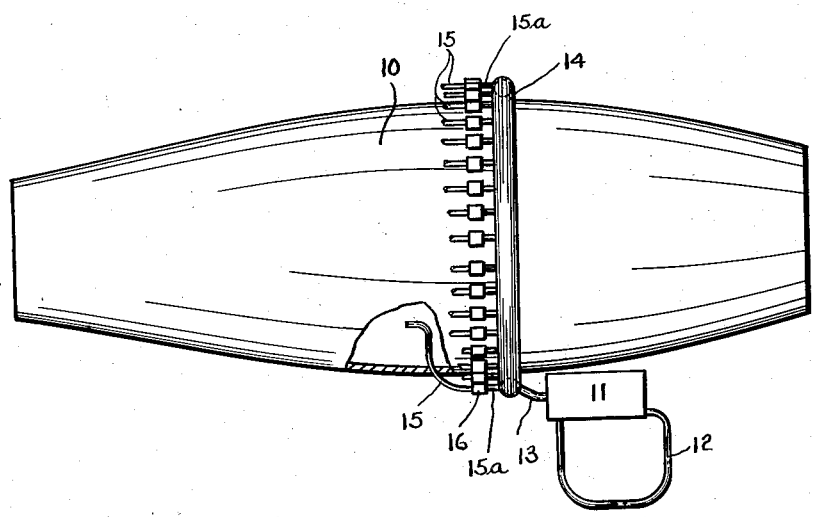

Jan. 24, 1961   C. H. NYSTROM ET AL   2,969,085
NON-CHATTERING FLOW DIVIDER VALVE
Filed Oct. 16, 1953

INVENTORS.
CARL H. NYSTROM
ARTHUR E. HUSE
BY
ATTORNEY.

2,969,085
NON-CHATTERING FLOW DIVIDER VALVE

Carl H. Nystrom, West Springfield, and Arthur E. Huse, Springfield, Mass., assignors to American Bosch Arma Corporation, a corporation of New York Filed Oct. 16, 1953, Ser. No. 386,595

1 Claim. (Cl. 137—514.7)

This invention relates to flow dividers and has particular reference to a new and improved valve arrangement adapted to be incorporated in flow dividers for dividing the totaled flow into a number of equal parts and wherein a valve is required for each part into which the total flow is to be divided.

An object of the invention is to provide new and improved flow dividing valve means which is relatively simple, light weight, economical and efficient.

Another object is to provide an improved valve for a flow dividing arrangement incorporating a separate valve for each part into which the total flow is to be divided, wherein interference with or failure of operation of one or more of the valves does not interfere with the operation of the remaining valves which remaining valves will then give increased delivery.

Another object is to provide a new and improved flow divider valve of the type set forth which valves are adapted to provide equal delivery to each outlet.

Other objects and advantages of the invention will be apparent from the following description taken in connection with the accompanying drawing. It will be understood that changes may be made in the details of construction and arrangement of parts without departing from the spirit of the invention as set forth in the accompanying claim.

Figure 2:
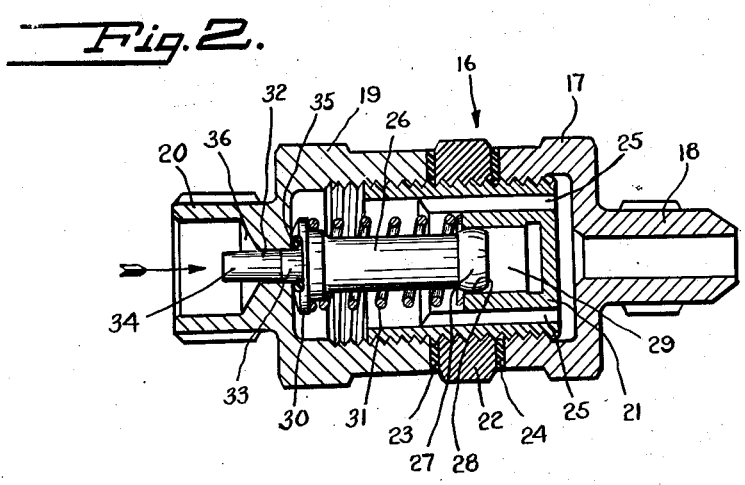

Reference to the drawing:

Fig. 1 is a diagrammatic view illustrating the operative positions of flow divider valves embodying the invention; and Fig. 2 is a longitudinal sectional view through one of the valves of the invention.

It is pointed out that flow dividers such as the present invention may be employed in connection with all types of jet engines such as turbo jet, jet, or turbo prop engines where it is desired to obtain equal or other desired divisions of a total flow into a number of equal parts. In the present invention, a separate valve is required for each part into which the total flow is to be divided.

Referring more particularly to the drawing as shown in Fig. 1, a device embodying a combustion chamber 10 is adapted to receive fuel from the system which includes the positive displacement pump with speed control 11 with the return or bypass line 12 for returning surplus fuel to the inlet side of the pump.

The pump is connected by the fuel line 13 to the gallery 14 which extends around the periphery of the combustion chamber 10 and the gallery 14 is adapted to receive fuel from pump 11 through line 13. Connected to gallery 14, in spaced relation around combustion chamber 10 of the jet, are the pipes and fittings 15 which may be equally spaced or otherwise as desired, and interposed in each of the lines 15 is a flow divider valve 16 adapted to control the quantity of fuel delivered into the combustion chamber by each of the fuel lines 15, which is usually the same through each of said lines and, therefore, the valve 16 divides the total flow received from the gallery 14 into a number of equal parts, the number being determined by the number of pipes 15 and valves 16 and, as will be seen from the drawing, a separate pipe 15 and valve 16 is required for each part into which the total flow is to be divided.

Each of the flow control valves 16 comprises a valve body fiitting portion 17 having the reduced portion 18 for connection to the line 15 and the threaded fitting 19 having the threaded portion 20 for connection to the line portion 15a.

Within the fitting 19 and portion 17, which have internally threaded portions, is screwed the valve guide 21 which has a threaded external surface. Between fitting 19 and portion 17 is the lock nut 22 and between the lock nut 22 and the adjacent surfaces of the fitting 19 and the portion 17 are positioned the gaskets 23 and 24 respectively.

The valve guide 21 is provided with longitudinal openings 25 of desired number and of which four or six has been found satisfactory for the passage of fuel through the valve guide.

Mounted for sliding movement within valve guide 21 is valve 26 having the end portion 27 with a curved periphery 28 positioned within dashpot 29 in valve guide 21. The clearance between the ball or curved periphery 28 and the wall of the dashpot 29 is sufficient to allow fuel to flow past the curved or ball periphery 28 and behind the piston or valve 26 in chamber 29 where it acts as a dashpot and prevents chattering of the valve.

The valve has the spring seat 30 adapted to be engaged by the coil spring 31 for normally retaining the valve in closed position.

The portion 19 has the straight walled bore or opening 32 therethrough and into this opening extends the end of the valve 26 which end comprises the land portion 33 and the tapered needle portion 34. If desired, an O ring 35 may be positioned on the valve adjacent bore 32 for sealing purposes.

Adjacent the outer end of bore 32 may be provided the tapered wall 36.

It will be seen that because of the tapered needle 34 a variable area orifice is provided across which is maintained a pressure drop.

In construction, the valve guide 21 with the valve 26 and valve spring 31 may be positioned within fitting 19 to the position where the desired opening pressure of the valve is obtained and then the lock nut 22 is screwed into place to lock the parts in the adjusted relation and the fitting 17 screwed into position.

It will be noted that in Fig. 2, the direction of flow of fluid is as shown by the arrow and that the threaded fitting 20 is a portion connected to the pipe portion 15a.

In operation, the valves divide the total flow into a number of equal parts and if one or several of the valves should become inoperative, for the same reason, this will not interfere with the operation of the remaining valves which remaining valves will then give increased delivery, that is, the total flow will be equally divided among the remaining valves each of which will then provide greater delivery.

It will also be seen that because of the piston action of the valve in the dashpot that chattering of the needle valve is prevented.

From the foregoing it will be seen that simple, efficient and economical means have been provided for obtaining all of the objects and advantages of the invention.

We claim:

In a device of the character described, a casing member having an opening adapted to form an inlet at one end and having an internal threaded portion adjacent its opposite end, a valve guide member having a threaded portion in engagement with said internal threaded portion, a lock nut in engagement with said threaded portion of said valve guide for locking said casing member and valve guide in adjusted position, a second casing member having an internal threaded portion in engagement with the threaded portion on said valve guide, said second casing member having an outlet, a flow control member in said first mentioned casing member, a dashpot in said valve guide, said valve member having a portion extending into said dashpot and a needle metering portion extending into said inlet and forming a variable area orifice with said inlet, and spring means to normally retain said valve in closed position.

References Cited in the file of this patent
UNITED STATES PATENTS

| | | |
|---|---|---|
| 1,413,089 | Will | Apr. 18, 1922 |
| 1,466,171 | Jacobsen | Aug. 28, 1923 |
| 1,612,597 | Alexandrescu | Dec. 28, 1926 |
| 1,779,421 | Cox | Oct. 28, 1930 |
| 1,851,438 | Luks | Mar. 29, 1932 |
| 1,940,999 | Ferlin | Dec. 26, 1933 |
| 2,268,119 | Honstetter | Dec. 30, 1941 |
| 2,289,946 | Weatherhead | July 14, 1942 |
| 2,339,101 | Parker | Jan. 11, 1944 |